US012620305B2

(12) United States Patent
Sonnenburg et al.

(10) Patent No.: US 12,620,305 B2
(45) Date of Patent: May 5, 2026

(54) METHOD, SYSTEM, COMPUTER PROGRAM AND COMPUTER READABLE MEDIUM FOR GENERATING CLOSURE DATA RELATING TO CLOSURE OF A STRETCH OF NAVIGABLE ELEMENTS

(71) Applicant: TomTom Traffic B.V., Amsterdam (NL)

(72) Inventors: Sören Sven Sonnenburg, Berlin (DE); Przemyslaw Polewski, Burton, MI (US); Lucian Ionescu, Berlin (DE); Gijs Peters, Amsterdam (NL); Yucel Kenan Ozturk, Amsterdam (NL)

(73) Assignee: TomTom Traffic B.V., Amsterdam (NL)

( * ) Notice: Subject to any disclaimer, the term of this patent is extended or adjusted under 35 U.S.C. 154(b) by 89 days.

(21) Appl. No.: 18/556,722

(22) PCT Filed: Apr. 27, 2022

(86) PCT No.: PCT/EP2022/061263
§ 371 (c)(1),
(2) Date: Oct. 23, 2023

(87) PCT Pub. No.: WO2022/229289
PCT Pub. Date: Nov. 3, 2022

(65) Prior Publication Data

US 2024/0194063 A1 Jun. 13, 2024

(30) Foreign Application Priority Data

Apr. 28, 2021 (EP) ...................................... 2106085

(51) Int. Cl.
*G08G 1/01* (2006.01)

(52) U.S. Cl.
CPC ......... *G08G 1/0141* (2013.01); *G08G 1/0112* (2013.01); *G08G 1/0133* (2013.01)

(58) Field of Classification Search
CPC .. G08G 1/0141; G08G 1/0112; G08G 1/0133; G08G 1/015
See application file for complete search history.

(56) References Cited

U.S. PATENT DOCUMENTS 10,497,256 B1 * 12/2019 Mubarek ............ G01C 21/3841
2016/0275787 A1 9/2016 Kesting et al.
(Continued)

FOREIGN PATENT DOCUMENTS

CN 107850454 A 3/2018
CN 111613049 A * 9/2020 ........... G08G 1/0129
(Continued)

OTHER PUBLICATIONS

English Machine Translation of CN111613049—Accessed May 29, 2025.*
(Continued)

*Primary Examiner* — Thomas E Worden
*Assistant Examiner* — Blake A Wood
(74) *Attorney, Agent, or Firm* — Whitmyer IP Group LLC

(57) ABSTRACT

A method for generating data regarding closure of a stretch of navigable elements, includes: identifying source navigable elements and destination navigable elements in a region around the stretch; generating traffic flow indicators, each being based on a comparison of a reference measure and a closure measure. The reference measure indicates a number of first journeys relative to a number of second journeys during a reference period. The closure measure indicates a number of first journeys relative to a number of second journeys during a test period. Each first journey includes movement of a respective client from a respective source navigable element to a navigable element of the stretch and then to a respective destination navigable element. Each second journey includes movement of a respec-
(Continued)

tive client from a respective source navigable element to a respective destination navigable element without a stretch navigable element. The data is generated based on the indicators.

20 Claims, 3 Drawing Sheets

(56) References Cited

U.S. PATENT DOCUMENTS

| | | | | |
|---|---|---|---|---|
| 2018/0158325 | A1* | 6/2018 | Bernhardt | G08G 1/0129 |
| 2018/0252541 | A1* | 9/2018 | Kesting | G08G 1/0141 |
| 2019/0089634 | A1* | 3/2019 | Jin | H04L 43/0882 |
| 2020/0090503 | A1* | 3/2020 | Rolf | G08G 1/0116 |

FOREIGN PATENT DOCUMENTS

| | | | |
|---|---|---|---|
| JP | 2008293064 | A | 12/2008 |
| JP | 4517166 | B1 | 8/2010 |
| WO | 2014147200 | A1 | 9/2014 |
| WO | 2015050348 | A1 | 4/2015 |
| WO | 2015173252 | A1 | 11/2015 |
| WO | 2017009466 | A1 | 1/2017 |
| WO | 2017037155 | A1 | 3/2017 |

OTHER PUBLICATIONS

International Search Report and Written Opinion of the International Searching Authority; Application No. PCT/ EP2022/061263; Completed: Jul. 20, 2022; Mailing Date: Jul. 29, 2022; 71 Pages.

* cited by examiner

METHOD, SYSTEM, COMPUTER PROGRAM AND COMPUTER READABLE MEDIUM FOR GENERATING CLOSURE DATA RELATING TO CLOSURE OF A STRETCH OF NAVIGABLE ELEMENTS

TECHNICAL FIELD

The present invention relates to methods, systems and computer programs for generating closure data relating to closure of a stretch of navigable elements.

BACKGROUND OF THE INVENTION

Vehicles (such as cars, motorbikes, lorries, etc.) usually travel along "navigable elements" of a network of navigable elements. The "navigable element" may be a road, or a portion/section of a road, within a road network. It will be appreciated, though, that other types of "navigable element" exist, e.g. routes, or parts thereof, taken by ferries or trains; paths, or parts thereof, for pedestrians; cycle paths or parts thereof; etc. Thus, a navigable element may be viewed as a part of a transport network along which travel may be conducted, e.g. by a vehicle, a person, etc.

Sometimes, a navigable element may be closed (i.e. have, or experience, a closure). This may take many forms—e.g. the navigable element may be closed to all vehicles or to some types of vehicle; the navigable element may be closed in one or more directions; all parts of the navigable element may be closed, or only a subset of parts of the navigable element (e.g. certain lanes of a road) may be closed. Closures can happen for a variety of reasons, e.g. so that maintenance/building work on the navigable element can take place; so that other maintenance/building work (e.g. for a utility service) in the vicinity of the navigable element can take place; due to an accident, such as a car crash; due to hazardous environmental conditions (e.g. flooding); etc. The duration of closures can vary significantly from one closure to the next, depending on the specific circumstances surrounding the closures.

Methods for obtaining information about a closure of a navigable element are well-known. For example:

(a) WO2014/147200 describes a method to detect closures based on location data. The method detects when there is a change in the traffic distribution in the network. Imbalance in the inflow of traffic may signal the end of a closed navigable element. Imbalance at the outflow of traffic may signal the start of a closed navigable element.

(b) WO2015/050348 describes a method of detecting the closure of a navigable element forming part of a network of navigable elements within a geographic area. It uses positional data to determine an elapsed time since a device was last detected on the navigable element, and the determined elapsed time is compared to an expected time interval between consecutive devices being detected on the navigable element. The navigable element is identified as being potentially closed, subject to one or more optional validation steps, when the determined elapsed time exceeds the expected time interval, e.g. by a predetermined amount.

(c) WO2015/173252 describes a method of identifying navigable stretches that are partially closed. A server obtains positional data relating to the movement of a plurality of devices along a navigable stretch with respect to time in a given time period, wherein the time period is a period of non-congested traffic flow. The positional data is used to determine an average speed of travel along the navigable stretch in the given time period. The determined average speed of travel is compared to a free flow speed for the navigable stretch, and the navigable stretch is identified as being partially closed when the determined average speed of travel is lower than the free flow speed by a predetermined value.

(d) WO2017/009466 and WO2017/009464 describe methods to detect the closure and opening (respectively) of a navigable element. The methods involve assigning a passability function and adjusting the function based on location data and on a report from an external source.

(e) WO2017/037155 describes a method for detecting that a previously closed navigable element is open when location data over a time interval exceeds a threshold value determined based on location data for an earlier time period.

Often, the information on closures (particularly road closures) is determined by processing so-called "probe data" provided by navigation clients (e.g. clients in, or executed by, vehicles travelling on the network; clients carried by pedestrians, such as mobile phone apps; etc.). Additionally, information on closures may be obtained from third parties (e.g. when a road management entity plans a closure to occur at some point in the future).

Reliable information on closures strives to avoid false negatives (missed closures) and false positives (reporting non-closed navigable elements as being closed). This is often challenging, at least in part due to the wide range of scenarios in which closures can take place (the reasons for the closure, the configuration of navigable elements in the vicinity of the closure, the type of closure, etc.). Detecting closures is further complicated as even for closed navigable elements, some types of traffic (e.g. motorcycles, bicycles, pedestrians, emergency vehicles) may still be able to travel on such navigable elements or on navigable elements that are close to the closed navigable elements (e.g. pedestrian walkways, parallel roads, work traffic roads, bicycle paths). Other complications are that the closure and reopening times are not always well established. As fast reporting is desirable for those travelling on the network and for navigation client users, improving closure detection, and improving provision of information about closures, is important.

SUMMARY

According to a first aspect of the invention, there is provided a method for generating closure data relating to closure of a stretch of navigable elements during a target time period, wherein the stretch comprises one or more navigable elements of a network of navigable elements within a geographic area, wherein the method comprises: identifying a set of source navigable elements of the network and a set of destination navigable elements of the network in a region around the stretch; generating one or more traffic flow indicators for the stretch, each traffic flow indicator being for a respective test time period in a set of one or more test time periods within the target time period, each traffic flow indicator being based on a comparison of a respective reference traffic flow measure for the stretch and a respective closure traffic flow measure for the stretch, wherein: (a) the reference traffic flow measure is indicative of a number of first journeys during a reference time period for the test time period relative to a number of second journeys during the reference time period, and (b) the closure traffic flow measure is indicative of a number of first journeys during the test time period relative to a number of second journeys during the test time period, wherein each first journey comprises movement of a respective client from a respective source navigable element to at least one navigable element of the stretch and then to a respective destination navigable element, and each second journey comprises movement of a respective client from a respective source navigable element to a respective destination navigable element without a navigable element of the stretch between the source navigable element and the destination navigable element; and generating the closure data based on the one or more traffic flow indicators.

In some embodiments, the closure data comprises an indication of whether, during the target time period, the stretch had a closure.

The first test time period in the set of one or more test time periods may be the target time period, and the indication of whether, during the target time period, the stretch had a closure may be generated according to the traffic flow indicator for the first test time period.

The reference time period for the first test time period may be for the same time as the target time period but on a day preceding the day of the target time period. Alternatively, the reference time period for the first test time period may be for the same time as the target time period but on the day immediately preceding the day of the target time period. Alternatively, the reference time period for the first test time period may be for the same time as the target time period but on a day that is the same weekday as, and that precedes, the day of the target time period. Alternatively, the reference time period for the first test time period may be a period of time immediately preceding the target time period.

The reference time period for the first test time period may be a period of time for which it is known or is assumed that the stretch did not have a closure. With such embodiments, the method may comprise: (a) determining that the stretch had a closure during the target time period if the traffic flow indicator for the first test time period indicates that the reference traffic flow measure for the first test time period differs from the closure traffic flow measure for the first test time period by at least a first threshold; or (b) determining that the stretch did not have a closure during the target time period if the traffic flow indicator for the first test time period indicates that the reference traffic flow measure for the first test time period does not differ from the closure traffic flow measure for the first test time period by at least the first threshold. Additionally or alternatively, with such embodiments, the method may comprise: (a) determining that the stretch had a closure during the target time period if the traffic flow indicator for the first test time period corresponds to an increase, above a second threshold, of the number of second journeys relative to the number of first journeys compared to the number of second journeys relative to the number of first journeys for the reference time period; or (b) determining that the stretch did not have a closure during the target time period if the traffic flow indicator for the first test time period does not correspond to an increase, above the second threshold, of the number of second journeys relative to the number of first journeys compared to the number of second journeys relative to the number of first journeys for the reference time period.

In some embodiments, the closure data comprises a time indication, the time indication being an indication of a time at which the stretch closed and/or an indication of a time at which the stretch reopened.

The method may comprise generating, for each test time period in a sequence of successive test time periods within the target time period, a corresponding traffic flow indicator, wherein the time indication is determined based on changes between traffic flow indicators for successive test time periods in the sequence of test time periods. The time at which the stretch closed and/or the time at which the stretch reopened may be determined according to successive test time periods for which there is a maximal magnitude of change between their traffic flow indicators. In some such embodiments, either: (a) the time at which the stretch closed is determined according to successive test time periods for which there is a maximal increase between their traffic flow indicators and the time at which the stretch reopened is determined according to successive test time periods for which there is a maximal decrease between their traffic flow indicators; or (b) the time at which the stretch closed is determined according to successive test time periods for which there is a maximal decrease between their traffic flow indicators and the time at which the stretch reopened is determined according to successive test time periods for which there is a maximal increase between their traffic flow indicators.

In some embodiments, either: (a) all of the test time periods in the sequence of successive test time periods have the same the reference time period; or (b) for each of the test time periods in the sequence of successive test time periods except for the first test time period in the sequence of successive test time periods, the reference time period for that test time period is the immediately preceding test time period in the sequence of successive test time periods.

In some embodiments, the method comprises maintaining a database of traces, wherein each trace represents a journey of a respective client in the geographic area, wherein the first journeys and the second journeys are journeys, or parts thereof, represented by traces in the database.

In some embodiments, the closure data is generated for one or more types of vehicle, wherein the first journeys and the second journeys are journeys for clients of vehicles of the one or more types of vehicle.

In some embodiments, the set of source navigable elements and the set of destination navigable elements are identified based, at least in part, on the stretch.

For example, identifying the set of source navigable elements and the set of destination navigable elements may comprise identifying one or more predetermined navigable elements that are associated, in a database, with at least one navigable element of the stretch.

The set of source navigable elements and the set of destination navigable elements may also be identified based, at least in part, on the reference time period.

For example, identifying the set of source navigable elements and the set of destination navigable elements may comprise: identifying journeys comprising movement of a respective client to or via at least one navigable element of stretch during the reference time period; and selecting one or more navigable elements involved in the identified journeys as source navigable elements and/or as destination navigable elements. Said selecting may comprise: (a) selecting, as source navigable elements, one or more navigable elements in the identified journeys that occur before the at least one navigable element of the stretch involved in the identified journeys; and/or (b) selecting, as destination navigable elements, one or more navigable elements in the identified journeys that occur after the at least one navigable element of the stretch involved in the identified journeys.

The set of source navigable elements and the set of destination navigable elements may be identified based, at least in part, on being a target distance from the stretch. The target distance may comprise: (a) a distance, or a range of distances, within the geographic area; (b) a number, or a range of numbers, of navigable elements.

In some embodiments, the method comprises determining the region around the stretch, wherein identifying the set of source navigable elements and the set of destination navigable elements comprises identifying one or more navigable elements that intersect a boundary of the region around the stretch.

According to a second aspect of the invention, there is provided a system adapted to carry out above-mentioned first aspect or any embodiment thereof.

According to a third aspect of the invention, there is provided a computer program which, when executed by one or more processors, causes the one or more processors to carry out the above-mentioned first aspect or any embodiment thereof. The computer program be stored on a computer readable medium

BRIEF DESCRIPTION OF THE DRAWINGS

Embodiments of the invention will now be described, by way of example only, with reference to the accompanying drawings, in which.

DETAILED DESCRIPTION

In the description that follows and in the figures, certain embodiments of the invention are described. However, it will be appreciated that the invention is not limited to the embodiments that are described and that some embodiments may not include all of the features that are described below. It will be evident, however, that various modifications and changes may be made herein without departing from the broader spirit and scope of the invention as set forth in the appended claims.

1—System Overview

Figure 1:
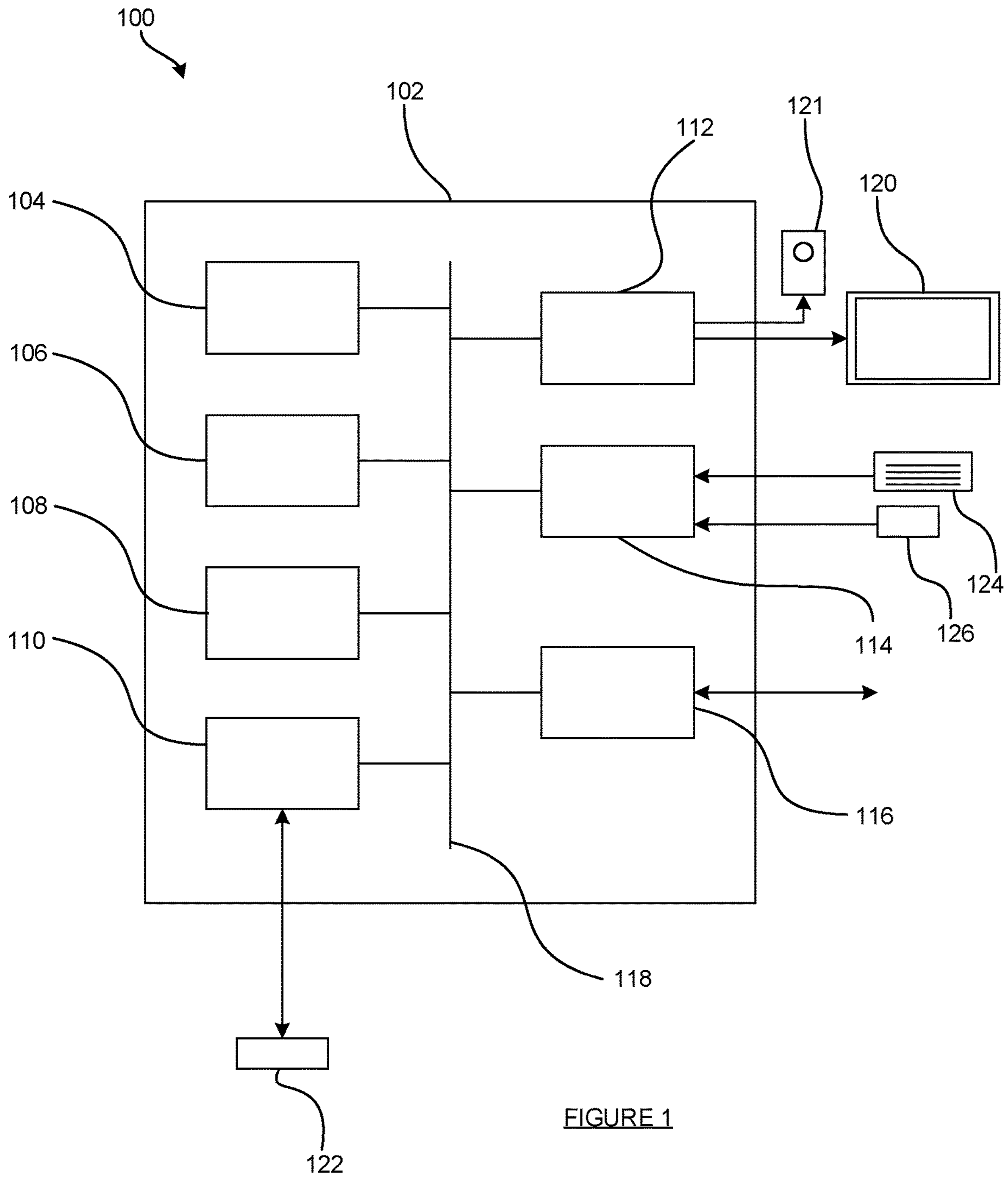
FIG. 1 schematically illustrates an example of a computer system.

FIG. 1 schematically illustrates an example of a computer system 100. The system 100 comprises a computer 102. The computer 102 comprises: a storage medium 104, a memory 106, a processor 108, an interface 110, a user output interface 112, a user input interface 114 and a network interface 116, which may be linked together over one or more communication buses 118.

The storage medium 104 may be any form of non-volatile data storage device such as one or more of a hard disk drive, a magnetic disc, a solid-state-storage device, an optical disc, a ROM, etc. The storage medium 104 may store an operating system for the processor 108 to execute in order for the computer 102 to function. The storage medium 104 may also store one or more computer programs (or software or instructions or code).

The memory 106 may be any random access memory (storage unit or volatile storage medium) suitable for storing data and/or computer programs (or software or instructions or code).

The processor 108 may be any data processing unit suitable for executing one or more computer programs (such as those stored on the storage medium 104 and/or in the memory 106), some of which may be computer programs according to embodiments of the invention or computer programs that, when executed by the processor 108, cause the processor 108 to carry out a method according to an embodiment of the invention and configure the system 100 to be a system according to an embodiment of the invention. The processor 108 may comprise a single data processing unit or multiple data processing units operating in parallel, separately or in cooperation with each other. The processor 108, in carrying out data processing operations for embodiments of the invention, may store data to and/or read data from the storage medium 104 and/or the memory 106.

The interface 110 may be any unit for providing an interface to a device 122 external to, or removable from, the computer 102. The device 122 may be a data storage device, for example, one or more of an optical disc, a magnetic disc, a solid-state-storage device, etc. The device 122 may have processing capabilities—for example, the device may be a smart card. The interface 110 may therefore access data from, or provide data to, or interface with, the device 122 in accordance with one or more commands that it receives from the processor 108.

The user input interface 114 is arranged to receive input from a user, or operator, of the system 100. The user may provide this input via one or more input devices of the system 100, such as a mouse (or other pointing device) 126 and/or a keyboard 124, that are connected to, or in communication with, the user input interface 114. However, it will be appreciated that the user may provide input to the computer 102 via one or more additional or alternative input devices (such as a touch screen). The computer 102 may store the input received from the input devices via the user input interface 114 in the memory 106 for the processor 108 to subsequently access and process, or may pass it straight to the processor 108, so that the processor 108 can respond to the user input accordingly.

The user output interface 112 is arranged to provide a graphical/visual and/or audio output to a user, or operator, of the system 100. As such, the processor 108 may be arranged to instruct the user output interface 112 to form an image/video signal representing a desired graphical output, and to provide this signal to a monitor (or screen or display unit) 120 of the system 100 that is connected to the user output interface 112. Additionally or alternatively, the processor 108 may be arranged to instruct the user output interface 112 to form an audio signal representing a desired audio output, and to provide this signal to one or more speakers 121 of the system 100 that is connected to the user output interface 112.

Finally, the network interface 116 provides functionality for the computer 102 to download data from and/or upload data to one or more data communication networks.

It will be appreciated that the architecture of the system 100 illustrated in FIG. 1 and described above is merely exemplary and that other computer systems 100 with different architectures (for example with fewer components than shown in FIG. 1 or with additional and/or alternative components than shown in FIG. 1) may be used in embodiments of the invention. As examples, the computer system 100 could comprise one or more of: a personal computer; a server computer; a tablet; a laptop; etc. Additionally, it is possible that some components of the computer system 100 are not located in the computer 102 and are, instead, part of a computer network connected to the computer 102 via the network interface 116. Additionally or alternatively, the computer system 100 may comprise multiple computers 102, e.g. in a network of computers such as a cloud system of computing resources.

Figure 2:
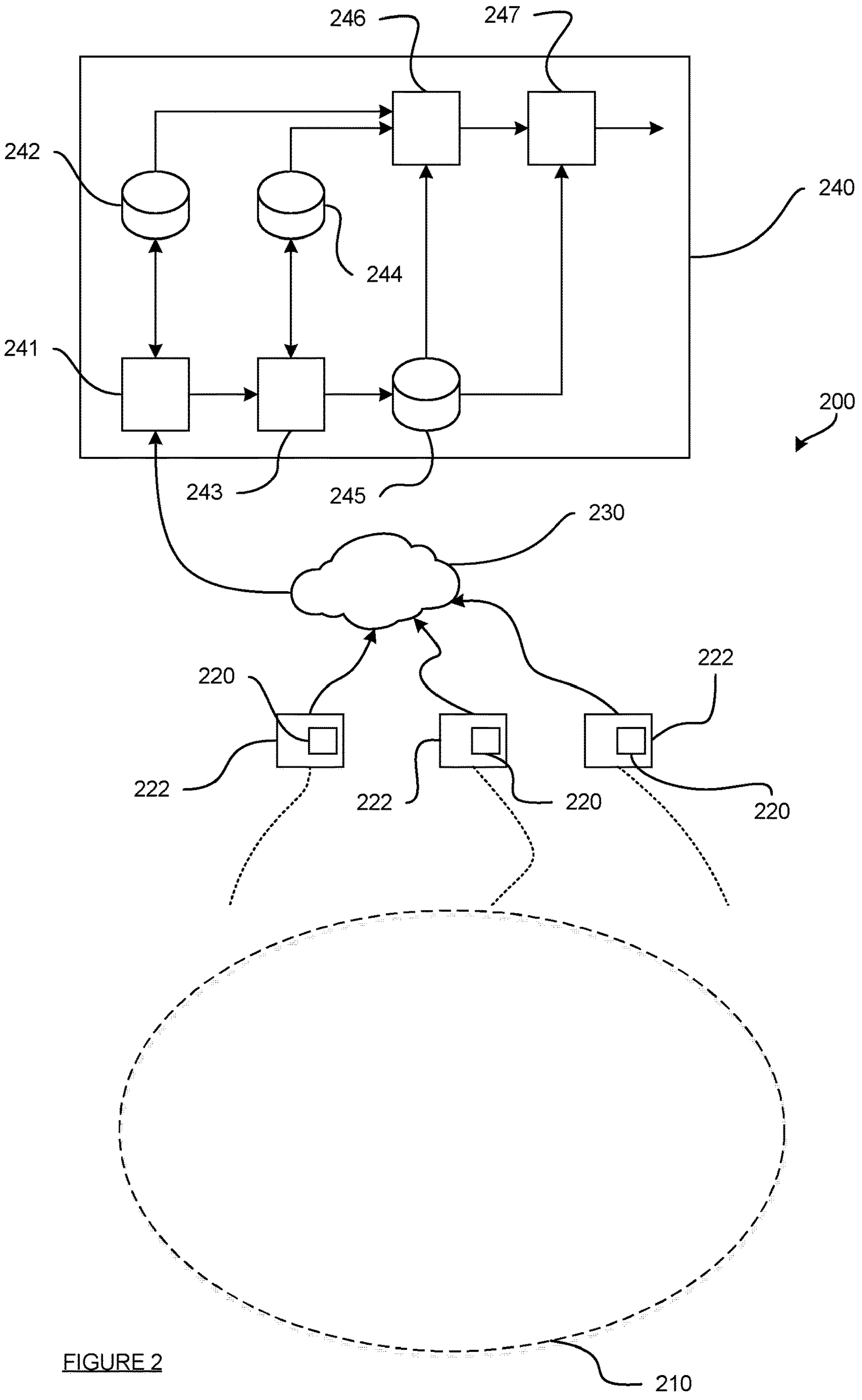
FIG. 2 schematically illustrates a system according to some embodiments of the invention.

FIG. 2 schematically illustrates a system 200 according to some embodiments of the invention.

In FIG. 2, an example network 210 of navigable elements in a geographic area is shown (the navigable elements being represented by respective lines connected at dots). As discussed below, the network 210 may be represented as an electronic map, for example, an electronic map describing a road network 210 in a geographic area. The network 210 may be a subnetwork of a larger network of navigable elements (i.e. a portion or area from a larger map). It will be appreciated that the specific network 210 illustrated is merely an example, and that in practice the network 210 may comprise many more navigable elements in a variety of configurations. In FIG. 2, the dots represent connections (or junctions) between, or end-points of, respective navigable elements. As mentioned, the "navigable elements" may be roads and/or portions/sections of roads, with the network 210 then being a road network. It will be appreciated, though, that other types of "navigable element" exist, e.g. routes, or parts thereof, taken by ferries or trains; paths, or parts thereof, for pedestrians; cycle paths or parts thereof etc. Thus, a navigable element may be viewed as a part of a transport network along which travel may be conducted, e.g. by a vehicle, a person, etc. In FIG. 2, the navigable elements are shown as being undirected (i.e. travel may be conducted in both ways along the navigable element). In practice, some navigable elements may be directed (e.g. one-way streets). The electronic map representation of the network 210 may store such direction information as metadata associated with a navigable element. Alternatively, a navigable element may be represented so that travel along that navigable element is directed from a start location of the navigable element to an end location of the navigable element—thus, for example, in such embodiments, if a travel along a road (or other such part of the network) in both directions is permitted, then that road may be represented by two navigable elements (one for each direction of travel), i.e. by two directed navigable elements.

FIG. 2 illustrates a plurality of navigation clients 220 located within the network 210 (the locations being indicated by the dotted arrows). Whilst FIG. 2 illustrates three such clients 220, it will be appreciated that this is merely an example number of clients 220—the number, identity and location of the clients 220 may change over time. Each client 220 may be transported around the network 210 by a respective client carrier 222, e.g. a car, lorry, motorbike, or other vehicle, or a person, etc. The clients 220 are responsible for generating probe data and providing the probe data to a navigation data processing system 240. The nature of the probe data shall be described shortly. The probe data may be provided by the clients 220 to the navigation data processing system 240 via one or more communication networks (such as the network 230 illustrated in FIG. 2).

The clients 220 may be implemented as software and/or hardware. For example, some clients 220 may be navigation applications executing on portable devices (such as mobile telephones); some clients 220 may be dedicated navigation assistance devices (e.g. satnav devices); etc.

The probe data generated by a client 220 generally contains location information indicating a geographic location of the client 220 (e.g. GNSS information comprising a latitude, a longitude and an altitude) and a time associated with that geographic location. The probe data may contain additional information such as one or more of: an identifier of the client 220; a speed of travel of the client 220; an indication of a vehicle type (or a type of the respective client carrier 222); etc.

The nature of the clients 220 and the probe data that they generate and provide is well-known and shall not, therefore, be described in more detail herein. The clients 220 may be implemented in software and/or hardware.

The navigation data processing system 240 comprises: a probe data acquisition system 241; a probe data database 242; a map matching system 243; a map data database 244; a traces database 245; a candidate closure detection system 246; and a closure data generation system 247. The navigation data processing system 240 and its components may be implemented in software and/or hardware, such as one or more computer programs executing on one or more computer systems 100.

The probe data acquisition system 241 is responsible for obtaining, or acquiring, probe data that has been generated, and provided, by the clients 220 (e.g. via the network 230). The probe data acquisition system 241 may store the probe data in the probe data database 242 (e.g. as part of a record in association with an identifier of the particular client 220 that provided the probe data).

The map data database 244 stores map data. The map data may be in one or more forms or formats, may be of one or more corresponding types, and may be suitable for one or more corresponding purposes. For example, the map data may comprise data that provide a model or representation of geospatial reality for a portion of a geographical region including the network 210. Such map data may represent stationary features (such as road infrastructure features for a road network) that are relevant for vehicle navigation systems. The map data may comprise data relating to each of the navigable elements of the network 210 (e.g. location of start and/or end nodes/positions of the navigable elements; lane data for navigable elements; permitted direction and/or speed of travel data for navigable elements; etc.). Such map data is well-known and shall not, therefore, be described in more detail herein.

The map matching system 243 is arranged to receive, from the probe data acquisition system 241, probe data acquired from a client 220, and is arranged to identify, based on the map data stored in the map data database 244 and the geographic location indicated by the probe data, a navigable element on which that client 220 is currently located/travelling (and possibly a distance travelled along the identified navigable element). Likewise, the client 220 may also be arranged to identify the navigable element on which the client 220 is currently located/travelling, e.g. in order to display a location of the vehicle 222 to a user—whilst the probe data may indicate/identify the navigable element as determined by the client 220, the probe data usually, instead, comprises more raw/unprocessed data, such as data indicating a latitude, longitude and possibly altitude. Thus, in the example of roads, the map matching system 243 may determine which road (or section of road) is being travelled along (at the time indicated by the probe data) by a client 220 within a vehicle 222. The map matching system 243 may then store, or update, a "trace" within the traces database 245. A trace represents a timed sequence of navigable elements that form a journey for a client 220—if there is no current trace for the client 220, then a new trace (identifying the just-identified navigable element and the associated time from the probe data) for that client 220 may be stored in the traces database 245 to represent the current journey; if there is a current trace for the client 220 being stored in the traces database 245, then the map matching system 243 may update that trace 220 within the traces database 245 (so that the just-identified navigable element, and the associated time from the probe data, is identified in the sequence of navigable elements that form the current journey of the client 220). The trace may comprise additional data, such as speed of travel and type of client carriers 222, which may have been obtained from, or based on, the probe data.

Methods by which the map matching system 243 may identify navigable elements corresponding to probe data, and by which the map matching system 243 may store and update traces in the traces database 245, are well-known and shall not, therefore, be described in more detail herein. Over time, many traces for a client 220 may be stored in the traces database 245 (representing different journeys undertaken by that client 220). Likewise, over time, many traces for different clients 220 may be stored in the traces database 245.

The candidate closure detection system 246 may use any known technique (such as one or more of the above-mentioned methods for obtaining information about a closure of a navigable element) to identify a stretch (herein a "candidate stretch") and a target time period for the stretch. Herein, a stretch is a contiguous sequence of navigable elements of the network 210. The stretch may be "directed", in that the direction of travel along the navigable elements of the stretch may be indicated (or may be implicit if, for example, the navigable elements themselves are directed, as discussed above). The particular candidate stretch identified by the candidate closure detection system 246 is a stretch which the candidate closure detection system 246 has identified as (possibly) having (or having had) a closure. The target time period is a period (or duration or interval) of time during which the candidate closure detection system 246 identifies this closure as (possibly) having taken place. As mentioned, there are many known ways in which a candidate stretch and associated target time period may be identified—some such methods may make use of one or more of: probe data stored in the probe data database 242; map data stored in the map data database 244; traces stored in the traces database 245; other data. As such methods are well-known, they shall not be described in more detail herein.

The closure data generation system 247 receives, or obtains, data identifying the candidate stretch and the target time period from the candidate closure detection system 246. In the system 200 of FIG. 2, the purpose of the closure data generation system 247 is to generate closure data for the candidate stretch—this closure data may comprise, for example, one or more of: an indication of whether or not that candidate stretch had a closure during the target time period; a start time for the closure; an end time for the closure; data relating to the nature of the closure (e.g. whether the closure is specific to certain types of client carriers 222; whether the closure is for one or more lanes of a navigable element; whether the closure is for one or more directions of a navigable element; etc.).

Thus in summary, as a client 220 moves around the network 210 of navigable elements, the client 220 generates and provides probe data to the navigation data processing system 240. The probe data may be stored by the navigation data processing system 240 (e.g. in the probe data database 242) and processed so as to identify the current navigable element on which that client 220 is located/travelling. Based on this, a trace (representing the current journey of the client 220) may be stored or updated in the traces database 245. The candidate closure detection system 246 may (based on probe data and/or map data and/or traces and/or other data) identify a stretch which the candidate closure detection system 246 considers has experienced (or is experiencing) a closure, along with a period of time (the target time period) during which that closure is considered to have occurred. The closure data generation system 247 may obtain data identifying the candidate stretch and the target time period and act to verify/authenticate the conclusion reached by the candidate closure detection system 246—i.e. check whether or not the candidate stretch did indeed have a closure during the target time period. Additionally or alternatively, the closure data generation system 247 may generate additional or alternative data relating to closure of the stretch (e.g. as discussed above).

In some embodiments, the candidate closure detection system 246 is a system configured/optimized for quickly processing large amounts of data to identify candidate stretches and target time periods, with the closure data generation system 247 then only having to process a smaller amount of focused data—thus, the closure data generation system 247 may be configured to perform more intensive/complex processing than the candidate closure detection system 246 since the closure data generation system 247 is required for processing only those candidate stretches identified by the candidate closure detection system 246 in contrast to the candidate closure detection system 246 which may be searching for closures across the whole network 210. The candidate closure detection system 246 may, therefore, be viewed as a coarse filter for identifying candidates stretches that may have experienced (or that may be currently experiencing) a closure, with the closure data generation system 247 serving to reduce the number of false positives in the results generated by the candidate closure detection system 246.

It will, however, be appreciated that the closure data generation system 247 may be used in systems with a different configuration than that of the system 200 in FIG. 2. For example, the closure data generation system 247 may be used as a primary source of identifying closures of navigable elements—e.g. instead of using the candidate closure detection system 246 to generate a candidate stretch and target time period, the closure data generation system 247 may be configured to test/process various stretches (without them having been identified as potentially having a closure) and produce closure data accordingly. Thus, it will be appreciated that in various other embodiments, the origin of the candidate stretch and target time period (as obtained by the closure data generation system 247) may be different.

2—Examples of Generation of Closure Data

To facilitate understanding of the invention, various examples of generation of closure data by the closure data generation system 247 are set out below. It will be appreciated that the mathematical framework set out below is merely for ease of explanation, and that other approaches could be used instead.

The network 210 may be modelled as a directed graph $G=(V, E)$, where V is a set of nodes of the graph G and where E is the set of edges of the graph G. Each edge $e \in E$ represents a navigable element, and each node $v \in V$ represents an intersection/junction/meeting etc. between two or more navigable elements. Each edge $e \in E$ connects a start node $v_s$ and a destination node $v_d$ (with $v_s, v_d \in V$). Since each edge $e \in E$ represents a navigable element, the terms "edge" and "navigable element" may be used interchangeably in the following examples, and the set E may be considered to be a set of navigable elements (or a set of representations of, of identifiers of, navigable elements).

As mentioned, the closure data generation system 247 performs processing in relation to a candidate stretch. In the following, the candidate stretch is represented as C. In particular, the stretch C is a contiguous stretch of M navigable elements (edges of the graph G), for some positive integer M≥1, i.e.

$$C=\{c_i | c_i \in E \wedge 1 \le i \le M \wedge c_i=(c_{s_i}, v_{d_i}) \wedge v_{s_i}, v_{d_i} \in V \wedge v_{d_i}=v_{s_{i+1}}\}$$

Here, the term contiguous means that the end of each navigable element $c_i$ ($1 \le i < M$) is connected (via a common node) to the next navigable element $c_{i+1}$ of the set C.

The closure data generation system 247 also performs processing based on traces from the traces database 245. Each trace $h_i$ represents a trip, or journey, of a navigation client 220 as a timed sequence of navigable elements (edges of the graph G), i.e.

$$h_i=\{(e_{i,j}, t_{i,j}) | e_{i,j} \in E \wedge 1 \le j \le N_i \wedge e_{i,j}=(v_{s_{i,j}} v_{d_{o,j}}) \wedge v_{s_{i,j}}, v_{e_{i,j}} \in V \wedge v_{d_{i,j}}=v_{s_{i,j+1}}\}$$

In other words, the trace $h_i$ comprises, or may be represented as, a set of $N_i$ contiguous navigable elements $e_{i,j}$ in which each navigable element $e_{i,j}$ is associated with a time of travel $t_{i,j}$. As the trace $h_i$ is a timed sequence of navigable elements, it follows that $t_{i,j} < t_{i,j+1}$ for $1 \le j < N_i$. The term contiguous means that the end of each navigable element $e_{i,j}$ ($1 \le j < N_i$) is connected (via a common node) to the next navigable element $e_{i,j+1}$ of the set $h_i$. The traces database 245 may, therefore, be considered to comprise a set H of stored traces with $$H=\{h_i | 1 \le i \le |H|\}$$

As discussed above, each trace $h_i$ may comprise additional information regarding the corresponding trip/journey and/or the corresponding client 220.

The set H of stored traces may be filtered by criteria related to the time and edges of the traversal—the following notation shall be used herein:

(i) H[a|T] indicates the subset of trajectories from H which pass though edge a in a time interval/period T;

(ii) $H[a \rightsquigarrow b|T]$ indicates the subset of trajectories from H which pass from edge a to edge b within a time interval/period T;

(iii) $H[a \rightsquigarrow C \rightsquigarrow b|T]$ indicates the subset of trajectories from H which pass from edge a, subsequently through any edge from the stretch C, and subsequently to edge b within a time interval/period T;

(iv) $H[a \rightsquigarrow b|\neg C, T]$ indicates the subset of trajectories from H which pass from edge a to edge b without passing through an edge from the stretch C within a time interval/period T, i.e. $H[a \rightsquigarrow b|\neg C, T]=H[a \rightsquigarrow b|T] \setminus H[a \rightsquigarrow C \rightsquigarrow b|T]$.

As mentioned, the closure data generation system 247 performs processing in relation to the candidate stretch C and for a target time period, referred to herein as $T_A$. The target time period $T_A$ may be viewed as a period of time for which closure data is to be generated, i.e. a time interval of interest.

2.1—Decision on Whether the Stretch had a Closure

In some embodiments, the closure data generated by the closure data generation system 247 comprises an indication of whether, during the target time period $T_A$, the stretch C had a closure. This indication may then, for example, be used as a verification result for the candidate closure detection system 246, as discussed above.

For this processing, the closure data generation system 247 also makes use of a reference time period $T_o$. The reference time period $T_o$ may be a time period during which the stretch C is known to be open and there is normal traffic in the network 210 around the stretch C, or, put another way, the reference time period $T_o$ may be a period of time for which it is known or is assumed that the stretch C did not have a closure. The notion of "normal" may be viewed as comparative, insofar as a closure may be viewed as a closure relative to a "normal" traffic flow. Thus, for example, a motorway with three lanes open may be the usual "normal" and a closure may be viewed as occurring if any one or more of the lanes is closed. However, if the motorway undergoes prolonged maintenance work so that only one lane is open, then normal traffic flow may become the traffic flow experienced when there is just this one lane open and a closure may be viewed as occurring if that lane also closes. To help cater for such dynamic traffic conditions (including seasonal, weekly, daily variations, etc.), the reference time period $T_o$ may be defined in a variety of ways, such as: (a) the reference time period $T_o$ may be for the same time as the target time period $T_A$ but on a day preceding the day of the target time period $T_A$ (which may be the day immediately preceding the day of the target time period $T_A$); (b) the reference time period $T_o$ may be for the same time as the target time period $T_A$ but on a day that is the same weekday as, and that precedes, the day of the target time period $T_o$ (which may be in the week immediately preceding the week of the target time period $T_A$); (c) the reference time period $T_o$ may be a period of time immediately preceding the target time period $T_A$ (and may be of the same duration as, or a different duration from, the target time period $T_A$, and may be of a predetermined duration). It will be appreciated, however, that the reference time period $T_o$ may be the defined in other ways.

Additionally, this processing makes use of a set S of sources and a set D of destinations. The sources s∈S are edges e∈E, i.e. they represent navigable elements of the network 210. Likewise, destinations d∈D are edges e∈E, i.e. they represent navigable elements of the network 210. As with the set of edges E, since each source s∈S and each destination d∈D represents a respective navigable element, the terms "edge" and "navigable element" may be used interchangeably in the following examples, and the sets S and D may be considered to be sets of navigable elements (or sets of representations of, of identifiers of, navigable elements).

Figure 3:
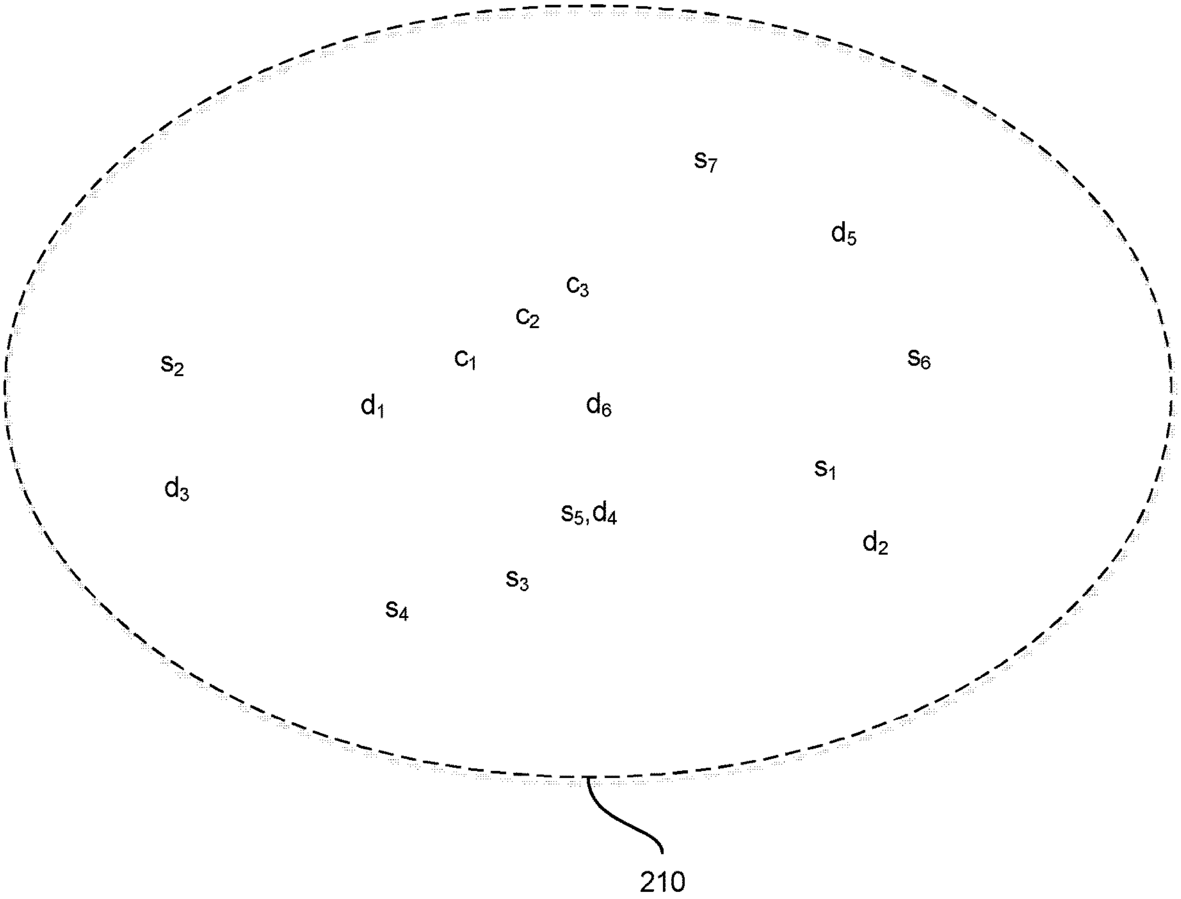
FIG. 3 illustrates an example of the network of FIG. 2.

Particular methods for arriving at the set S of sources and the set D of destinations shall be discussed later. In general, though, the source navigable elements s∈S of the network 210 and the destination navigable elements d∈D of the network 210 are in a region around the stretch C. FIG. 3 illustrates an example of the network 210 of FIG. 2, with a stretch $C=\{c_i | 1 \le i \le 3\}$, a set of sources $S=\{s_i | 1 \le i \le 7\}$ and a set of destinations $D=\{d_i | 1 \le i \le 6\}$. It will be appreciated that this is merely an example for ease of illustration. As can be seen, the number of sources s∈S may be different from the number of destinations d∈D. Additionally, as shown by source $s_5$ and destination $d_4$, a source and a destination may be/represent the same navigable element.

For any source s∈S and any destination d∈D, and a time interval/period T, a function $f_{C,\alpha}$ for the stretch C may be defined as:

$$f_{C,\alpha}(s, d, T) = \frac{|H[s \rightsquigarrow C \rightsquigarrow d, T]| + \alpha}{|H[s \rightsquigarrow d |\neg C, T]| + \alpha}$$

The function $f_{C,\alpha}$ describes an amount of traffic (or journeys) between the source s and the destination d that passes through (or involves) one or more navigable elements of the stretch C during the time period T relative to an amount of traffic (or journeys) between the source s and the destination d that does not pass through (or involve) any navigable element of the stretch C during the time period T. Further, the function $f_{C,\alpha}$ uses a positive Laplace smoothing parameter $\alpha$ that reduces the impact of small or zero trace counts, although in some embodiments the parameter $\alpha$ may be omitted.

The function $f_{C,\alpha}$ can be applied to all combinations of sources $s \in S$ in the set S of sources with destinations $d \in D$ in the set D of destinations, with the results combined, e.g. by multiplication or addition. For example, for the set S of sources and the set D of destinations, and for a time interval/period T, a function $F_{C,\alpha}$ for the stretch C may be defined as:

$$F_{C,\alpha}(S, D, T) = \prod_{\substack{s \in S \\ d \in D}} f_{C,\alpha}(s, d, T)$$

The function $F_{C,\alpha}$ therefore describes an amount of traffic (or journeys) between sources in the set S of sources and destinations in the set D of destinations that pass through (or involve) one or more navigable elements of the stretch C during the time period T relative to an amount of traffic (or journeys) between sources in the set S of sources and destinations in the set D of destinations that do not pass through (or involve) any navigable element of the stretch C during the time period T. As with the function $f_{C,\alpha}$, the function $F_{C,\alpha}$ uses a positive Laplace smoothing parameter $\alpha$ that reduces the impact of small or zero trace counts, although in some embodiments the parameter $\alpha$ may be omitted.

With the formulation of the function $f_{C,\alpha}$ as set out above, for the set S of sources and the set D of destinations, and for a time interval/period T, the value of $F_{C,\alpha}(S, D, T)$ should be higher if there is not a closure of the stretch C during the time interval/period T compared to if there is a closure of the stretch C during the time interval/period T, since the number of journeys between sources $s \in S$ in the set S of sources and destinations $d \in D$ in the set D of destinations that avoid the stretch C should increase if the stretch C has a closure and, likewise, the number of journeys between sources $s \in S$ in the set S of sources and destinations $d \in D$ in the set D of destinations that involve/intersect the stretch C should decrease if the stretch C has a closure, so that the denominator of $f_{C,\alpha}$ should increase with the numerator of $f_{C,\alpha}$ decreasing if there is a closure.

Thus, a reference traffic flow measure $F_{C,\alpha}(S, D, T_o)$ based on the reference time period $T_o$ and a closure traffic flow measure $F_{C,\alpha}(S, D, T_A)$ based on the target time period $T_A$ may be generated for the stretch C. As can be seen, the reference traffic flow measure $F_{C,\alpha}(S, D, T_o)$ is indicative of a number of first journeys during the reference time period $T_o$ relative to a number of second journeys during the reference time period $T_o$, where each first journey comprises movement of a respective client 220 from a respective source navigable element $s \in S$ to at least one navigable element of the stretch C and then to a respective destination navigable element $d \in D$, and wherein each second journey comprises movement of a respective client 220 from a respective source navigable element $s \in S$ to a respective destination navigable element $d \in D$ without a navigable element of the stretch C between the source navigable element s and the destination navigable element d. Likewise, the closure traffic flow measure $F_{C,\alpha}(S, D, T_A)$ is indicative of a number of such first journeys during the target period $T_A$ relative to a number of such second journeys during the target time period $T_A$.

The closure data generation system 247 may generate a traffic flow indicator $I_{C,o}$ for the stretch C as, or based on, a comparison of the reference traffic flow measure $F_{C,\alpha}(S, D, T_o)$ for the stretch C and the closure traffic flow measure $F_{C,\alpha}(S, D, T_A)$ for the stretch C. For example, the difference $I_{C,o}=F_{C,\alpha}(S, D, T_o)-F_{C,\alpha}(S, D, T_A)$ may be calculated and, (a) if $I_{C,o}$ exceeds a predetermined threshold then the closure data generation system 247 may generate closure data that indicates that the stretch C did have a closure in the target time period $T_A$, whereas (b) if $I_{C,o}$ does not exceed the predetermined threshold then the closure data generation system 247 may generate closure data that indicates that the stretch C did not have a closure in the target time period $T_A$. It will be appreciated that other comparisons of the reference traffic flow measure $F_{C,\alpha}(S, D, T_o)$ for the stretch C and the closure traffic flow measure $F_{C,\alpha}(S, D, T_A)$ for the stretch C are possible (e.g. the difference $I_{C,o}=F_{C,\alpha}(S, D, T_A)-F_{C,\alpha}(S, D, T_o)$ may be calculated and compared to a predetermined threshold; the ratio $I_{C,o}=F_{C,\alpha}(S, D, T_A)/F_{C,\alpha}(S, D, T_o)$ may be calculated and compared to a predetermined threshold; etc.), with the corresponding analysis/conclusion (and closure data) regarding the occurrence or absence of a closure for the stretch C during the target time period $T_A$ being adapted accordingly to the definition of $I_{C,o}$.

The comparison of the reference traffic flow measure $F_{C,\alpha}(S, D, T_o)$ for the stretch C and the closure traffic flow measure $F_{C,\alpha}(S, D, T_A)$ for the stretch C is robust to proportional changes in traffic, e.g. at night or on weekends there typically is less traffic passing through the stretch C but there also will be less traffic going from sources $s \in S$ to destinations $d \in D$ in general. This, for example, helps identify/eliminate false positives generated by the candidate closure detection system 246.

Note that it is possible to use variants of the above-described function $f_{C,\alpha}$ instead. For example, one could define variant $\hat{f}_{C,\alpha}$ by swapping the numerator and denominator of $f_{C,\alpha}$, so that $$\hat{f}_{C,\alpha}(s, d, T) = \frac{|H[s \rightsquigarrow d|_{\neg} C, T]| + \alpha}{|H[s \rightsquigarrow C \rightsquigarrow d, T]| + \alpha}$$

With this formulation $\hat{f}_{C,\alpha}$ for the function $f_{C,\alpha}$, for the set S of sources and the set D of destinations, and for a time interval/period T, the value of the $F_{C,\alpha}(S, D, T)$ should be lower if there is not a closure of the stretch C during the time interval/period T compared to if there is a closure of the stretch C during the time interval/period T, since the number of journeys between sources $s \in S$ in the set S of sources and destinations $d \in D$ in the set D of destinations that avoid the stretch C should increase if the stretch C has a closure and, likewise, the number of journeys between sources $s \in S$ in the set S of sources and destinations $d \in D$ in the set D of destinations that involve/intersect the stretch C should decrease if the stretch C has a closure, so that the numerator of $\hat{f}_{C,\alpha}$ should increase with the denominator of $\hat{f}_{C,\alpha}$ decreasing if there is a closure.

As another example, one could define variant $\hat{\hat{f}}_{C,\alpha}$ as the number of traces, from a source $s \in S$ to a destination $d \in D$ in the time period T, that pass through a part of the stretch C relative to all the traces in the time period T from the source s∈S to the destination d∈D, e.g. as $$\hat{\hat{f}}_{C,\alpha}(s, d, T) = \frac{|H[s \rightsquigarrow C \rightsquigarrow d, T]| + \alpha}{|H[s \rightsquigarrow d|, T]| + \alpha}$$

With this formulation $\hat{\hat{f}}_{C,\alpha}$ for the function $f_{C,\alpha}$, for the set S of sources and the set D of destinations, and for a time interval/period T, the value of the $F_{C,\alpha}(S, D, T)$ should be higher if there is not a closure of the stretch C during the time interval/period T compared to if there is a closure of the stretch C during the time interval/period T, since the number of journeys between sources s∈S in the set S of sources and destinations d∈D in the set D of destinations that involve the stretch C should decrease if the stretch C has a closure and, therefore, the numerator of $\hat{\hat{f}}_{C,\alpha}$ should decrease if there is a closure.

Naturally, when a variant of the function $f_{C,\alpha}$ and/or a variant of the function $F_{C,\alpha}$ is used, then the comparison of the reference traffic flow measure $F_{C,\alpha}(S, D, T_o)$ for the stretch C and the closure traffic flow measure $F_{C,\alpha}(S, D, T_A)$ for the stretch C may need updating accordingly (e.g. a change in threshold; a change in whether a closure is detected if a comparison value is above or below a threshold; etc.)

As mentioned, in general the source navigable elements s∈S of the network 210 and the destination navigable elements d∈D of the network 210 are in a region around the stretch C. There are various methods by which set S of sources and the set D of destinations may be generated/identified. Various examples are set out below, but it will be appreciated that other techniques could be used instead.

In some embodiments, the set S of source navigable elements and the set D of destination navigable elements are identified based, at least in part, on the stretch C, various examples of which are set out below.

In some embodiments, the navigation data processing system 240 may determine a region around the stretch C (e.g. based on a predetermined shape and/or a predetermined area and/or a predetermined maximum distance away from the stretch C), which may be centred on the stretch C. The navigation data processing system 240 may then identify/generate the set S of source navigable elements and the set D of destination navigable elements by identifying one or more navigable elements (e.g. based on data in the map data database 244) that intersect a boundary of the region around the stretch C, e.g. the set S of source navigable elements and the set D of destination navigable elements each be defined (respectively) as one or more (or all) of the identified navigable elements.

In other embodiments, as discussed below, the set S of source navigable elements and the set D of destination navigable are identified by other techniques, with this then inherently defining the above-mentioned region around the stretch C (e.g. a boundary for the region may be formed based on start and/or end nodes for the identified navigable elements).

In some embodiments, the navigation data processing system 240 stores, in associated with each navigable element, an identifier of (or an indication of) one or more predetermined navigable elements to serve as source navigable elements and/or one or more predetermined navigable elements to serve as destination navigable elements. These associations may be stored, for example, in the map data database 244 (e.g. as part of, or linked to, a record for each navigable element). The closure data generation system 247 may then identify/generate the set S of sources as the set containing the source navigable elements associated with the navigable elements $c_i(1 \leq i \leq M)$ of the stretch C and, likewise, may identify/generate the set D of destinations as the set containing the destination navigable elements associated with the navigable elements $c_i(1 \leq i \leq M)$ of the stretch C. Thus, identifying the set S of source navigable elements and the set D of destination navigable elements may comprise identifying one or more predetermined navigable elements that are associated, in a database (e.g. the map database 244), with at least one navigable element of the stretch C.

In some embodiments, the set S of source navigable elements and the set D of destination navigable elements are identified based, at least in part, on the reference time period $T_o$ (in addition to the stretch C), various examples of which are set out below.

In some embodiments, the closure data generation system 247 generates/identifies the set S of sources and the set D of destinations based on the stretch C and on traces stored in the traces database 245, as discussed below in various examples.

In one example, the set S of sources and the set D of destinations are generated/identified by the closure data generation system 247 based on the navigable elements of the traces, from the traces database 245, that intersect with the stretch C during the reference time period $T_o$. The traces, from the traces database 245, that intersect with the stretch C during the reference time period $T_o$ are the set $H[C|T] = \cup_{c_i \in C} H[c_i|T_o]$. Some or all of the traces in the set H [C|T] may be used to identify one or more source navigable elements s for the set S of sources and/or one or more destination navigable elements d for the set D of destinations. Thus, the closure data generation system 247 may identify journeys/traces that comprise movement of their respective client 220 to or via at least one navigable element of the stretch C during the reference time period $T_o$, and may then select one or more navigable elements involved in the identified journeys/traces as source navigable elements and/or as destination navigable elements. There are various techniques for this, e.g. for a given trace $h_i \in H[C|T]$:

- One or more navigable elements of $h_i$ may be chosen at random for use as a source navigable element s for the set S and/or one or more navigable elements of $h_i$ may be chosen at random for use as a destination navigable element d for the set D.
- One or more navigable elements of $h_i$ may be identified and used as source navigable elements s for the set S based, at least in part, on being a target distance from the stretch C. The target distance may comprise, for example, the navigable element being: (a) a predetermined distance (or within a predetermined range of distances) within the geographic area from the stretch C; or (b) a predetermined number (or within a predetermined range of numbers) of navigable elements away from the stretch C. In some embodiments, from such navigable elements of $h_i$, only the one that is closest to the stretch C is chosen. In some embodiments, the closure data generation system 247 may identify the first/earliest visited/occurring navigable element $c_j$ of the stretch C within the trace $h_i$ and may select the first navigable element before $c_j$ within $h_i$ that meets the target distance.
- One or more navigable elements of $h_i$ may be identified and used as destination navigable elements d for the set D based, at least in part, on being a target distance from the stretch C. The target distance may comprise, for example: (a) the navigable element being a predetermined distance (or within a predetermined range of distances) within the geographic area from the stretch C; or (b) a predetermined number (or within a predetermined range of numbers) of navigable elements away from the stretch C. In some embodiments, from such navigable elements of $h_i$, only the one that is closest to the stretch C is chosen. In some embodiments, the closure data generation system 247 may identify the last visited/occurring navigable element $c_j$ of the stretch C within the trace $h_i$ and may select the first navigable element after $c_j$ within $h_i$ that meets the target distance.

The closure data generation system 247 may select, as source navigable elements s for the set S, one or more navigable elements of $h_i$ that occur before the/each navigable element of the stretch C involved in $h_i$. Additionally or alternatively, the closure data generation system 247 may select, as destination navigable elements d for the set D, one or more navigable elements of $h_i$ that occur after the/each navigable element of the stretch C involved in $h_i$.

In some embodiments, each navigable element identified for use a source navigable element s for the set S is also used as a destination navigable element d for the set D. Additionally or alternatively, in some embodiments, each navigable element identified for use a destination navigable element d for the set D is also used as a source navigable element s for the set S. Thus, in some embodiments, the set of sources S may be the same as the set D of destinations.

The closure data generation system 247 may apply one or more filters, or optimization processes, to the set S of sources and/or the set D of destinations, with a view to removing navigable elements which will have no (or only a minimal) impact on the end result and with a view to reducing the overall amount of processing required to reach that result. Alternatively, the filtering may involve not actually adding such navigable elements to the set S of sources and/or the set D of destinations in the first place (so that "removal" from the set S or the set D does not then need to take place). Examples of such filters are set out below—these examples discuss "removing" navigable elements from the sets S and D but, as mentioned above, it will be appreciated that these examples could equally be implemented so as to involve not including such navigable elements in the sets S and D in the first place (i.e. at the stage at which the decision is being made on whether or not to include a navigable element into the sets S and/or D). Since several filters may be applied one after another, it will be appreciated that the discussion below of filtering a set S or D may actually involve filtering the set S or D after one or more previous filters have already been applied to the set S or D.

It is possible, depending on how the set S of sources and/or the set D of destinations have been generated, for them to comprise a navigable element for which there are no traces in the traces database 245 that comprise both that navigable element and any navigable elements of the stretch C. Thus, in some embodiments, the closure data generation system 247 may filter the set S of sources by removing any navigable element from the set S for which there is no trace in the traces database 245 that comprises both that navigable element and any navigable elements of the stretch C. Additionally or alternatively, in some embodiments, the closure data generation system 247 may filter the set D of destinations by removing any navigable element from the set D for which there is no trace in the traces database 245 that comprises both that navigable element and any navigable elements of the stretch C. This type of filtering may focus on traces for the reference time period $T_o$, e.g. a source s may be retained in the set S provided that there exists some navigable element $c_i$ of the stretch C for which $|H[s \rightsquigarrow c_i, T_o]|>0$ and/or a destination d may be retained in the set D provided that there exists some navigable element $c_i$ of the stretch C for which $|H[c_i \rightsquigarrow d, T_o]|>0$.

In some embodiments, an edge $e \in E$ may be removed from the set S of sources and/or the set D of destinations unless there exists an edge $c_i$ of the stretch C for which $$\frac{|H[e, T_o] \cap H[c_i T_o]|}{|H[c_i, T_o]|} \geq \varrho$$

for some $0<\varrho<1$, i.e. unless the stretch C has at least one edge $c_i$ for which, out of the number of traces passing through that edge $c_i$ in the reference time period $T_o$, at least a certain proportion also pass through the edge e.

For filtering the set S of sources, a $\chi_s$-coverage relation may be used in relation to navigable elements $s_1$ and $s_2$. In particular, $s_1$ may be said to be "$\chi_s$-covered" by $s_2$ (represented as $$s_2 \overset{\chi_s}{\rightarrow} s_1)$$

if and only it for every navigable element $c_i \in C$, $s_2$ precedes $s_1$ on a fraction of at least $\chi_s$ of all traces in H which traverse $s_1$ before $c_i$ during the reference time period $T_o$, i.e.

$$s_2 \overset{\chi_s}{\rightarrow} s_1 \Leftrightarrow \forall_{c_i \in C} \frac{|H[s_2 \rightsquigarrow s_1 \rightsquigarrow c_i, T_o]|}{|H[s_1 \rightsquigarrow c_i, T_o]|} \geq \chi_s$$

The filtering may remove the navigable element $s_2$ from the set S of sources if $s_2$ $\chi_s$—covers another navigable element $s_1$ of the set S of sources. This may be performed because the navigable element $s_2$ precedes another navigable element $s_1$ in almost all trajectories of interest (before passing through the stretch C). Thus, there is likely to be little new information gained by considering the navigable element $s_2$, since the navigable element $s_1$ already provides the vast majority of the traces of interest—i.e. the navigable element $s_2$ may be dropped from further analysis without a loss of accuracy.

For filtering the set D of destinations, a similar $\chi_d$-coverage relation may be used in relation to navigable elements $d_1$ and $d_2$. In particular, $d_1$ may be said to be "$\chi_d$-covered" by $d_2$ (represented as $$d_2 \overset{\chi_d}{\rightarrow} d_1)$$

if and only if for every navigable element $c_i \in C$, $d_2$ follows $d_1$ on a fraction of at least $\chi_d$ of all traces in H which traverse $d_1$ after $c_i$ during the reference time period $T_o$, i.e.

$$d_2 \overset{\chi_d}{\rightarrow} d_1 \Leftrightarrow \forall_{c_i \in C} \frac{|H[c_i \rightsquigarrow d_1 \rightsquigarrow d_2, T_o]|}{|H[c_i \rightsquigarrow d_1, T_o]|} \geq \chi_d$$

The filtering may remove the navigable element $d_2$ from the set D of destinations if $d_2$ $\chi_d$-covers another navigable element $d_1$ of the set D of destinations. This may be performed because the navigable element $d_2$ follows another navigable element $d_1$ in almost all trajectories of interest (after passing through the stretch C). Thus, there is likely to be little new information gained by considering the navigable element $d_2$, since the navigable element $d_1$ already provides the vast majority of the traces of interest—i.e. the navigable element $d_2$ may be dropped from further analysis without a loss of accuracy.

In some embodiments, the $\chi_s$-coverage relation may be used to determine, for a navigable element $s \in S$, the subset $Q(s) \subseteq S$, where $$Q(s) = \left\{ s_j \mid s_j \in S \wedge s \overset{\chi_s}{\rightarrow} s_j \right\},$$

i.e. Q(s) is the set of navigable elements of the set S which are $\chi_s$-covered by the navigable element s. The set S of sources may be filtered so as to identify (and become) a minimally-sized subset $\hat{S}$ for which $\cup_{s \in \hat{S}} Q(s) = \hat{S}$. The elements of $\hat{S}$ can be seen as 'independent' representatives of S which, taken together, cover the whole original set S. The set $\hat{S}$ may be determined, for example, by applying the greedy heuristic algorithm as described in "Chvatal, V. "*A Greedy Heuristic for the Set-Covering Problem*", Mathematics of Operations Research Vol. 5, No. 3 (August, 1979), pp. 233-235, the entire disclosure of which is incorporated herein by reference in its entirety.

Likewise, the $\chi_d$-coverage relation may be used to determine, for a navigable element $d \in D$, the subset $Q(d) \subseteq D$, where $$Q(d) = \left\{ d_j \mid d_j \in D \wedge d \overset{\chi_d}{\rightarrow} d_j \right\},$$

i.e. Q(d) is the set of navigable elements of the set D which are $\chi_d$-covered by the navigable element d. The set D of destinations may be filtered so as to identify (and become) a minimally-sized subset $\hat{D}$ for which $\cup_{d \in \hat{D}} Q(d) = \hat{D}$. The elements of $\hat{D}$ can be seen as 'independent' representatives of D which, taken together, cover the whole original set D. As above, the set $\hat{D}$ may be determined, for example, by applying the greedy heuristic algorithm as described in Chvatal, V. "*A Greedy Heuristic for the Set-Covering Problem*", Mathematics of Operations Research Vol. 5, No. 3 (August, 1979), pp. 233-235, the entire disclosure of which is incorporated herein by reference in its entirety.

The selection operation on the set of traces H to generate the set S of source navigable elements and the set D of destination navigable elements can be adapted to filter the traces based on the type of vehicle, e.g. to only make use of traces for clients 220 whose corresponding client carrier 222 is of a predetermined type (or types). This enables the generation of closure data relevant to a specific subset of vehicles (or client carriers 222). For example, using only traces from heavy vehicles (e.g. trucks or other large commercial vehicles) can be used to detect road closures for these types of vehicles. Other road closures may not apply to emergency vehicles (e.g. ambulances, police vehicle) or public transport vehicles (e.g. trams, busses, taxis).

Additionally or alternatively (and regardless of how the set S of source navigable elements and the set D of destination navigable elements is generated), the closure data generation system 247 may apply one or more filters on the set of traces H when determining a number of traces that satisfy a particular condition, in order to generate the closure data. For example, when determining the subsets H[a|T] and/or H[a $\rightsquigarrow$ b|T] and/or H[a $\rightsquigarrow$ C $\rightsquigarrow$ b|T] and/or H[a $\rightsquigarrow$ b|¬C, T] (for edges a and b, time interval/period T and stretch C), or when calculating values based on such subsets, the closure data generation system 247 may include in such subsets only those traces that satisfy one or more additional filter criteria and/or may exclude from such subsets traces that satisfy one or more additional filter criteria. For example, the closure data generation system 247 may filter the traces based on the type of vehicle, e.g. the subsets only include of traces for clients 220 whose corresponding client carrier 222 is of a predetermined type (or types). Again, this enables the generation of closure data relevant to a specific subset of vehicles (or client carriers 222). For example, using only traces from heavy vehicles (e.g. trucks or other large commercial vehicles) can be used to detect road closures for these types of vehicles. Other road closures may not apply to emergency vehicles (e.g. ambulances, police vehicle) or public transport vehicles (e.g. trams, busses, taxis).

2.2—Closure and Reopen Times

In some embodiments, the closure data generated by the closure data generation system 247 comprises a time indication, the time indication being an indication of a time at which the stretch C closed and/or an indication of a time at which the stretch C reopened.

For this processing, the closure data generation system 247 may divide the target time period $T_A$ into a sequence of P successive test time periods $T_1, T_2 \ldots, T_P$ within the target time period $T_A$ (for some integer P>1), i.e. the processing involves a plurality of test time periods. For example, if the target time period $T_A$ is the period from time $t_{min}$ to time $t_{max}$ (represented herein as $T_A=[t_{min}, t_{max}]$) then, for $1 \le k \le P$, $T_k$ may be defined as $$T_k = \left[ t_{min} + (k-1)\frac{(t_{max} - t_{min})}{P},\ t_{min} + k\frac{(t_{max} - t_{min})}{P} \right],$$

i.e. P equally sized non-overlapping periods within the target time period $T_A$ that together cover the target time period $T_A$. It will be appreciated, however, that the test time periods $T_1, T_2 \ldots, T_P$ need not necessarily be non-overlapping, may be of different sizes, and need not necessarily cover the entire target time period $T_A$. The number P of test time periods may be predetermined; alternatively, the number P of test time periods may be based on the size of the target time period $T_A$ (e.g. the size of each test time period may be a predetermined length Δ and the number of test time periods may be set to $$\left\lceil \frac{t_{max} - t_{min}}{\Delta} \right\rceil$$

so as have sufficient test time periods of this length Δ to cover the test time period $T_A$). It will be appreciated that other methods for arriving at the sequence of P successive test time periods $T_1, T_2 \ldots, T_P$ can be used. Each test time period $T_k$ ($1 \le k \le P$) may be viewed as having a corresponding representative time $t_k$ which may, for example, be the start, middle or end of $T_k$.

For each of the test time periods $T_k$ ($1 \le k \le P$), the closure data generation system 247 may generate a corresponding traffic flow indicator $I_{C,k}$ for the stretch C, each traffic flow indicator being based on a comparison of a respective reference traffic flow measure for the stretch C and a respective closure traffic flow measure for the stretch C. The reference traffic flow measure is indicative of a number of first journeys during a reference time period $T_{o,k}$ for the test time period $T_k$ relative to a number of second journeys during the reference time period $T_{o,k}$, each first journey comprising movement of a respective client 220 from a respective source navigable element to at least one navigable element of the stretch C and then to a respective destination navigable element, each second journey comprising movement of a respective client 220 from a respective source navigable element to a respective destination navigable element without a navigable element of the stretch C between the source navigable element and the destination navigable element; and (b) the closure traffic flow measure is indicative of a number of such first journeys during the test time period $T_k$ relative to a number of such second journeys during the test time period $T_k$.

The traffic flow indicator $I_{C,k}$ ($1 \le k \le P$) may be defined as $$I_{C,k} = \frac{F_{C,\alpha}(S, D, T_{o,k})}{F_{C,\alpha}(S, D, T_k)}$$

where the function $F_{C,\alpha}$ and the sets S and D may be defined and obtained as discussed previously.

In some embodiments, the reference time period $T_{o,k}$ for the test time period $T_k$ is the same for all of the test time periods, namely the above-discussed reference time period $T_o$, i.e. $T_{o,k} = T_o$ for ($1 \le k \le P$). The traffic flow indicator $I_{C,k}$ then approximates to 1 when the stretch C is open (i.e. does not have a closure). However, when the stretch C has a closure during the test time period $T_k$, the value of $F_{C,\alpha}(S, D, T_k)$ will be diverge from $F_{C,\alpha}(S, D, T_{o,k})$ in a substantial way. As discussed above, there are various variants for defining both the function $F_{C,\alpha}$ and $f_{C,\alpha}$, but in the example in which $$F_{C,\alpha}(S, D, T) = \prod_{\substack{s \in S \\ d \in D}} f_{C,\alpha}(s, d, T) \text{ and } f_{C,\alpha}(s, d, T) = \frac{|H[s \rightsquigarrow C \rightsquigarrow d, T]| + \alpha}{|H[S \rightsquigarrow d | \neg C, T]| + \alpha},$$

when the stretch C has a closure, the numerator $|H[s \rightsquigarrow C \rightsquigarrow d, t]|$ will decrease (or approach zero) and the denominator $|H[s \rightsquigarrow d | \neg C, T]|$ will be higher than when the stretch C does not have a closure. This means that the traffic flow indicator $I_{C,k}$ changes to a higher value (i.e. >1) for the test time period $T_{k_1}$ when the stretch C is first closed at some time during the test time period $T_{k_1}$ and remains near that higher value for subsequent test time periods $T_k$ until the test time period $T_{k_2}$ if the stretch C reopens at some time during the test time period $T_{k_2}$, with the traffic flow indicator $I_{C,k}$ for the test time period $T_{k_2}$ and subsequent test time periods returning to approximately 1. Hence the traffic flow indicator $I_{C,k}$ acts as a step function.

Thus, the closure data generation system 247 may identify the earliest test time period $T_{k_1}$ for which the corresponding traffic flow indicator $I_{C,k_1}$ is sufficiently different from 1 (e.g. above a certain predetermined threshold), and may identify that a closure started at some point during this test time period $T_{k_1}$—the closure data relating to the start of the closure may identify this test time period $T_{k_1}$ as the time during which the closure started, or may identify some specific time in the test time period $T_{k_1}$ (e.g. the start, middle or end of $T_{k_1}$) as the time at which the closure started. If the earliest test time period $T_1$ in the whole sequence of test time periods has a corresponding traffic flow indicator $I_{C,1}$ sufficiently different from 1, then the closure data generation system 247 may identify that a closure started at some point during or before this test time period $T_1$.

Likewise, the closure data generation system 247 may identify the earliest test time period $T_{k_2}$ for which the corresponding traffic flow indicator $I_{C,k_2}$ stops being substantially different from 1 (e.g. above a certain predetermined threshold), and may identify that a closure ended at some point during this test time period $T_{k_2}$—the closure data relating to the end of the closure may identify this test time period $T_{k_2}$ as the time during which the closure ended, or may identify some specific time in the test time period $T_{k_2}$ (e.g. the start, middle or end of $T_{k_2}$) as the time at which the closure end. If the very latest test time period $T_P$ in the whole sequence of test time periods has a corresponding traffic flow indicator $I_{C,P}$ sufficiently different from 1, then the closure data generation system 247 may identify that a closure has still not ended during the target time period $T_A$.

The function $I_{C,k}$ as defined above can be converted to a rate of change function by its (time) derivative function. The derivative function of a step function is a Dirac delta function that has a peak value around the changes (start/end) to the closure of the stretch C. The rate of change function may be defined as:

$$ROC(T_k) = \frac{I_{C,k} - I_{C,k-1}}{t_k - t_{k-1}}$$

The closure data generation system 247 may search for peak value (positive peak at a start of a closure and a negative peak at the end of a closure). During the stable parts of the function $I_{C,k}$ (open stretch or closed stretch conditions), the rate of change (ROC) function is close to zero. At the change points, the ROC function has a large positive or a large negative peak around closure time and re-open time respectively.

In other embodiments, the reference time period $T_{o,k}$ for the test time period $T_k$ ($1 < k \le P$) is the preceding test time period $T_{k-1}$, with the reference time period $T_{o,1}$ for the first test time period $T_1$ being a reference time period $T_o$ as discussed above, i.e. $T_{o,k} = T_{k-1}$ for ($1 \le k \le P$).

The traffic flow indicator $I_{C,k}$ then approximates to 1 when the stretch C is in a stable state (i.e. open or closed). However, when the stretch C has a closure beginning during the test time period $T_k$, the value of $F_{C,\alpha}(S, D, T_k)$ will be diverge from $F_{C,\alpha}(S, D, T_{o,k})$ in a substantial way. As discussed above, there are various variants for defining both the function $F_{C,\alpha}$ and $f_{C,\alpha}$, but in the example in which $$F_{C,\alpha}(S, D, T) = \prod_{\substack{s \in S \\ d \in D}} f_{C,\alpha}(s, d, T) \text{ and } f_{C,\alpha}(s, d, T) = \frac{|H[s \rightsquigarrow C \rightsquigarrow d, T]| + \alpha}{|H[S \rightsquigarrow d | \neg C, T]| + \alpha},$$

when the stretch C has a closure, the numerator $|H[z \rightsquigarrow C \rightsquigarrow d, T]|$ will decrease (or approach zero) and the denominator $|H[z \rightsquigarrow d | \neg C, T]|$ will be higher than when the stretch C does not have a closure. This means that the traffic flow indicator $I_{C,k}$ changes to a higher value (i.e. >1) for the test time period $T_{k_1}$ when the stretch C is first closed at some time during the test time period $T_{k_1}$ and will return to a value close to 1 for the remainder of the closure. If the stretch C reopens at some time during the test time period $T_{k_2}$the traffic flow indicator $I_{C,k}$ changes to a lower value (i.e. <1) for the test time period $T_{k_2}$ when the stretch C first reopens at some time during the test time period $T_{k_2}$ and will return to a value close to 1 thereafter.

Thus, the closure data generation system 247 may identify the test time period $T_{k_1}$ that has the highest corresponding traffic flow indicator $I_{C,k_1}$ that is sufficiently more than 1 (e.g. by a certain predetermined threshold), and may identify that a closure started at some point during this test time period $T_{k_1}$—the closure data relating to the start of the closure may identify this test time period $T_{k_1}$ as the time during which the closure started, or may identify some specific time in the test time period $T_{k_1}$ (e.g. the start, middle or end of $T_{k_1}$) as the time at which the closure started.

Likewise, the closure data generation system 247 may identify the test time period $T_{k_2}$ that has the lowest corresponding traffic flow indicator $I_{C,k_2}$ that is substantially less than from 1 (e.g. by a certain predetermined threshold), and may identify that a closure ended at some point during this test time period $T_{k_2}$—the closure data relating to the end of the closure may identify this test time period $T_{k_1}$ as the time during which the closure ended, or may identify some specific time in the test time period $T_{k_2}$ (e.g. the start, middle or end of $T_{k_2}$) as the time at which the closure end.

In some embodiments, the closure data generation system 247 may identify a start and end of a closure using a log of $I_{C,k}$. In particular, log ($I_{C,k}$) approximates to 0 when the stretch C is in a stable state (i.e. open or closed), log ($I_{C,k}$) is a positive value substantially above 0 (e.g. by a predetermined threshold) when a closure starts, and log ($I_{C,k}$) is a negative value substantially below 0 (e.g. by a predetermined threshold) when a closure ends.

As discussed above, there are various variants for defining both the function $F_{C,\alpha}$ and $f_{C,\alpha}$. When a variant of the function $f_{C,\alpha}$ and/or a variant of the function $F_{C,\alpha}$ is used, then the comparison of the reference traffic flow measures $F_{C,\alpha}(S, D, T_{o,k})$ for the stretch C and the closure traffic flow measure $F_{C,\alpha}(S, D, T_k)$ for the stretch C may need updating accordingly (e.g. a change in threshold; a change in whether a closure is detected if a comparison value is above or below a threshold; etc.). It will also be appreciated that the comparison (i.e. the traffic flow indicators $I_{C,k}$) may be defined in other ways, e.g. with the numerator and denominator reversed; based on a difference between $F_{C,\alpha}(S, D, T_{o,k})$ and $F_{C,\alpha}(S, D, T_k)$; etc.—again, it will be appreciated that, based on how the traffic flow indicators $I_{C,k}$ are defined, different thresholds, tests, etc. will be used accordingly.

In some embodiments, the target time period $T_A$ may be viewed as continually expanding as time goes on (or, put another way, viewed as not having an end point), so that additional further test time periods may be included and analysed accordingly—e.g. so that periodic (or ongoing) testing to detect opening or closing of the stretch C may be conducted.

3—Processing for Generation of Closure Data

Figure 4:
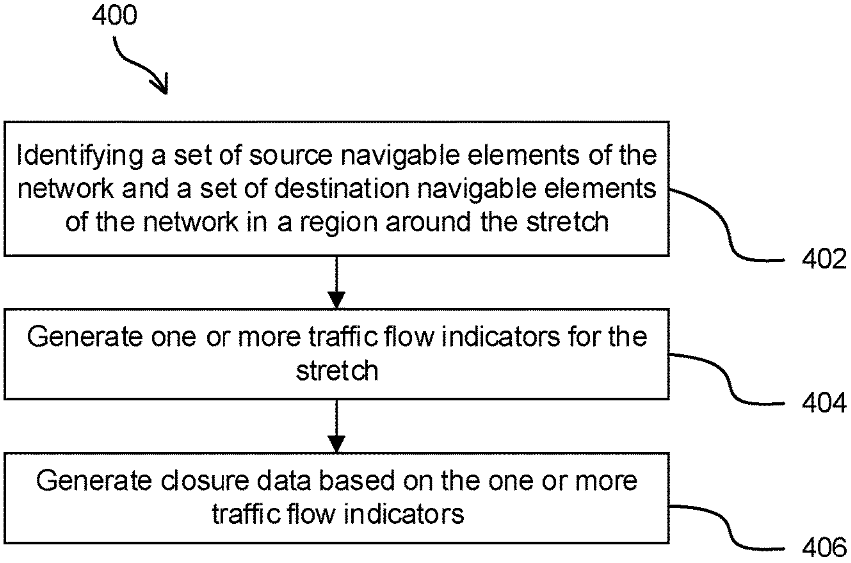
FIG. 4 is a flowchart illustrating a method to generate closure data relating to closure of a stretch.

FIG. 4 is a flowchart illustrating a method 400 that may be performed by the closure data generation system 247 to generate closure data relating to closure of the stretch C.

At a step 402, the set S of source navigable elements of the network 210 and the set D of destination navigable elements of the network 210 in a region around the stretch C are identified. Examples of how this may be performed have been discussed above.

At a step 404, one or more traffic flow indicators for the stretch are generated. Each traffic flow indicator is for a respective test time period in a set of one or more test time periods within the target time period $T_A$. Thus, with the example in section 2.1 above, the test time period for the traffic flow indicator $I_{C,o}$ may itself be the target time period $T_A$. With the example in section 2.2 above, a plurality of test time periods $T_1, T_2 \ldots, T_P$ may be used with respective traffic flow indicators $I_{C,1}, I_{C,2}, \ldots, I_{C,P}$ being generated accordingly. It will be appreciated that these two examples may be used together, so that the set of test time periods is $T_0, T_1, T_2 \ldots, T_P$, and with respective traffic flow indicator $I_{C,o}, I_{C,1}, I_{C,2}, \ldots, I_{C,P}$ being generated accordingly. It will also be appreciated that other embodiments may make use of different test time periods and traffic flow indicators accordingly.

As discussed above, each traffic flow indicator is generated based on a comparison of a respective reference traffic flow measure for the stretch and a respective closure traffic flow measure for the stretch, wherein: (a) the reference traffic flow measure is indicative of a number of first journeys during a reference time period for the test time period relative to a number of second journeys during the reference time period, and (b) the closure traffic flow measure is indicative of a number of first journeys during the test time period relative to a number of second journeys during the test time period, wherein each first journey comprises movement of a respective client from a respective source navigable element to at least one navigable element of the stretch and then to a respective destination navigable element, and each second journey comprises movement of a respective client from a respective source navigable element to a respective destination navigable element without a navigable element of the stretch between the source navigable element and the destination navigable element.

At a step 406, the closure data is generated based on the one or more traffic flow indicators. Thus, with the example in section 2.1 above, the closure data generated by the closure data generation system 247 may comprise an indication of whether, during the target time period $T_A$, the stretch C had a closure, with this being generated based on the traffic flow indicator $I_{C,o}$. Additionally or alternatively, with the example in section 2.2 above, the closure data generated by the closure data generation system 247 may comprise a time indication, the time indication being an indication of a time at which the stretch C closed and/or an indication of a time at which the stretch C reopened, with this being generated based on the traffic flow indicators $I_{C,1}, I_{C,2}, \ldots, I_{C,P}$. It will be appreciated, of course, that the closure data may comprise other information.

4—Modifications

It will be appreciated that the methods described have been shown as individual steps carried out in a specific order. However, the skilled person will appreciate that these steps may be combined or carried out in a different order whilst still achieving the desired result.

It will be appreciated that embodiments of the invention may be implemented using a variety of different information processing systems. In particular, although the figures and the discussion thereof provide an exemplary computing system and methods, these are presented merely to provide a useful reference in discussing various aspects of the invention. Embodiments of the invention may be carried out on any suitable data processing device, such as a personal computer, laptop, personal digital assistant, mobile telephone, set top box, television, server computer, etc. Of course, the description of the systems and methods has been simplified for purposes of discussion, and they are just one of many different types of system and method that may be used for embodiments of the invention. It will be appreciated that the boundaries between logic blocks are merely illustrative and that alternative embodiments may merge logic blocks or elements, or may impose an alternate decomposition of functionality upon various logic blocks or elements.

It will be appreciated that the above-mentioned functionality may be implemented as one or more corresponding modules as hardware and/or software. For example, the above-mentioned functionality may be implemented as one or more software components for execution by a processor of the system. Alternatively, the above-mentioned functionality may be implemented as hardware, such as on one or more field-programmable-gate-arrays (FPGAs), and/or one or more application-specific-integrated-circuits (ASICs), and/or one or more digital-signal-processors (DSPs), and/or one or more graphical processing units (GPUs), and/or other hardware arrangements. Method steps implemented in flowcharts contained herein, or as described above, may each be implemented by corresponding respective modules; multiple method steps implemented in flowcharts contained herein, or as described above, may be implemented together by a single module.

It will be appreciated that, insofar as embodiments of the invention are implemented by a computer program, then one or more storage media and/or one or more transmission media storing or carrying the computer program form aspects of the invention. The computer program may have one or more program instructions, or program code, which, when executed by one or more processors (or one or more computers), carries out an embodiment of the invention. The term "program" as used herein, may be a sequence of instructions designed for execution on a computer system, and may include a subroutine, a function, a procedure, a module, an object method, an object implementation, an executable application, an applet, a servlet, source code, object code, byte code, a shared library, a dynamic linked library, and/or other sequences of instructions designed for execution on a computer system. The storage medium may be a magnetic disc (such as a hard drive or a floppy disc), an optical disc (such as a CD-ROM, a DVD-ROM or a BluRay disc), or a memory (such as a ROM, a RAM, EEPROM, EPROM, Flash memory or a portable/removable memory device), etc. The transmission medium may be a communications signal, a data broadcast, a communications link between two or more computers, etc.

The invention claimed is:

1. A method for generating closure data relating to closure of a stretch of navigable elements during a target time period, wherein the stretch comprises one or more navigable elements of a network of navigable elements within a geographic area, wherein the method includes:

identifying a set of source navigable elements of the network and a set of destination navigable elements of the network in a region around the stretch;

generating one or more traffic flow indicators for the stretch, each traffic flow indicator being for a respective test time period in a set of one or more test time periods within the target time period, each traffic flow indicator being based on a comparison of a respective reference traffic flow measure for the stretch and a respective closure traffic flow measure for the stretch, wherein:

(a) the reference traffic flow measure is indicative of a number of first journeys during a reference time period for the test time period relative to a number of second journeys during the reference time period, and (b) the closure traffic flow measure is indicative of a number of first journeys during the test time period relative to a number of second journeys during the test time period, wherein each first journey includes movement of a respective client from a respective source navigable element to at least one navigable element of the stretch and then to a respective destination navigable element, and each second journey includes movement of a respective client from the respective source navigable element to the respective destination navigable element without a navigable element of the stretch between the source navigable element and the destination navigable element; and generating the closure data based on the one or more traffic flow indicators.

2. The method of claim 1, wherein the closure data comprises an indication of whether, during the target time period, the stretch had a closure.

3. The method of claim 2, wherein a first test time period in the set of one or more test time periods is the target time period, and the indication of whether, during the target time period, the stretch had a closure is generated according to the traffic flow indicator for the first test time period.

4. The method of claim 2, wherein one of the following applies:

(a) the reference time period for the first test time period is for the same time as the target time period but on a day preceding the day of the target time period;

(b) the reference time period for the first test time period is for the same time as the target time period but on the day immediately preceding the day of the target time period;

(c) the reference time period for the first test time period is for the same time as the target time period but on a day that is the same weekday as, and that precedes, the day of the target time period;

(d) the reference time period for the first test time period is a period of time immediately preceding the target time period.

5. The method of claim 2, wherein the reference time period for the first test time period is a period of time for which it is known or is assumed that the stretch did not have a closure.

6. The method of claim 5, comprising:

(a) determining that the stretch had a closure during the target time period if the traffic flow indicator for the first test time period indicates that the reference traffic flow measure for the first test time period differs from the closure traffic flow measure for the first test time period by at least a first threshold; or (b) determining that the stretch did not have a closure during the target time period if the traffic flow indicator for the first test time period indicates that the reference traffic flow measure for the first test time period does not differ from the closure traffic flow measure for the first test time period by at least the first threshold.

7. The method of claim 5, comprising:

(a) determining that the stretch had a closure during the target time period if the traffic flow indicator for the first test time period corresponds to an increase, above a second threshold, of the number of second journeys relative to the number of first journeys compared to the number of second journeys relative to the number of first journeys for the reference time period; or (b) determining that the stretch did not have a closure during the target time period if the traffic flow indicator for the first test time period does not correspond to an increase, above the second threshold, of the number of second journeys relative to the number of first journeys compared to the number of second journeys relative to the number of first journeys for the reference time period.

8. The method of claim 1, wherein the closure data comprises a time indication, the time indication being an indication of a time at which the stretch closed and/or an indication of a time at which the stretch reopened.

9. The method of claim 8, comprising generating, for each test time period in a sequence of successive test time periods within the target time period, a corresponding traffic flow indicator, wherein the time indication is determined based on changes between traffic flow indicators for successive test time periods in the sequence of test time periods.

10. The method of claim 9, wherein the time at which the stretch closed and/or the time at which the stretch reopened is determined according to successive test time periods for which there is a maximal magnitude of change between their traffic flow indicators.

11. The method of claim 10, wherein either:

(a) the time at which the stretch closed is determined according to successive test time periods for which there is a maximal increase between their traffic flow indicators and the time at which the stretch reopened is determined according to successive test time periods for which there is a maximal decrease between their traffic flow indicators; or (b) the time at which the stretch closed is determined according to successive test time periods for which there is a maximal decrease between their traffic flow indicators and the time at which the stretch reopened is determined according to successive test time periods for which there is a maximal increase between their traffic flow indicators.

12. The method of claim 9, wherein either:

(a) all of the test time periods in the sequence of successive test time periods have the same reference time period; or (b) for each of the test time periods in the sequence of successive test time periods except for the first test time period in the sequence of successive test time periods, the reference time period for that test time period is the immediately preceding test time period in the sequence of successive test time periods.

13. The method of claim 1, comprising maintaining a database of traces, wherein each trace represents a journey of a respective client in the geographic area, wherein the first journeys and the second journeys are journeys, or parts thereof, represented by traces in the database.

14. The method of claim 1, wherein the closure data is generated for one or more types of vehicle, wherein the first journeys and the second journeys are journeys for clients of vehicles of the one or more types of vehicle.

15. The method of claim 1, wherein the set of source navigable elements and the set of destination navigable elements are identified based, at least in part, on the stretch.

16. The method of claim 15, wherein identifying the set of source navigable elements and the set of destination navigable elements comprises identifying one or more predetermined navigable elements that are associated, in a database, with at least one navigable element of the stretch.

17. The method of claim 15, wherein the set of source navigable elements and the set of destination navigable elements are identified based, at least in part, on the reference time period.

18. The method of claim 15, wherein the set of source navigable elements and the set of destination navigable elements are identified based, at least in part, on being a target distance from the stretch.

19. The method of claim 18, wherein the target distance comprises:

(a) a distance, or a range of distances, within the geographic area;

(b) a number, or a range of numbers, of navigable elements.

20. The method of claim 15, comprising determining the region around the stretch, wherein identifying the set of source navigable elements and the set of destination navigable elements comprises identifying one or more navigable elements that intersect a boundary of the region around the stretch.

* * * * *